W. A. RIDDELL.
PHOTOGRAPHIC SHUTTER SPEED TESTING MACHINE.
APPLICATION FILED SEPT. 13, 1920.
1,431,897.
Patented Oct. 10, 1922.
3 SHEETS—SHEET 1.
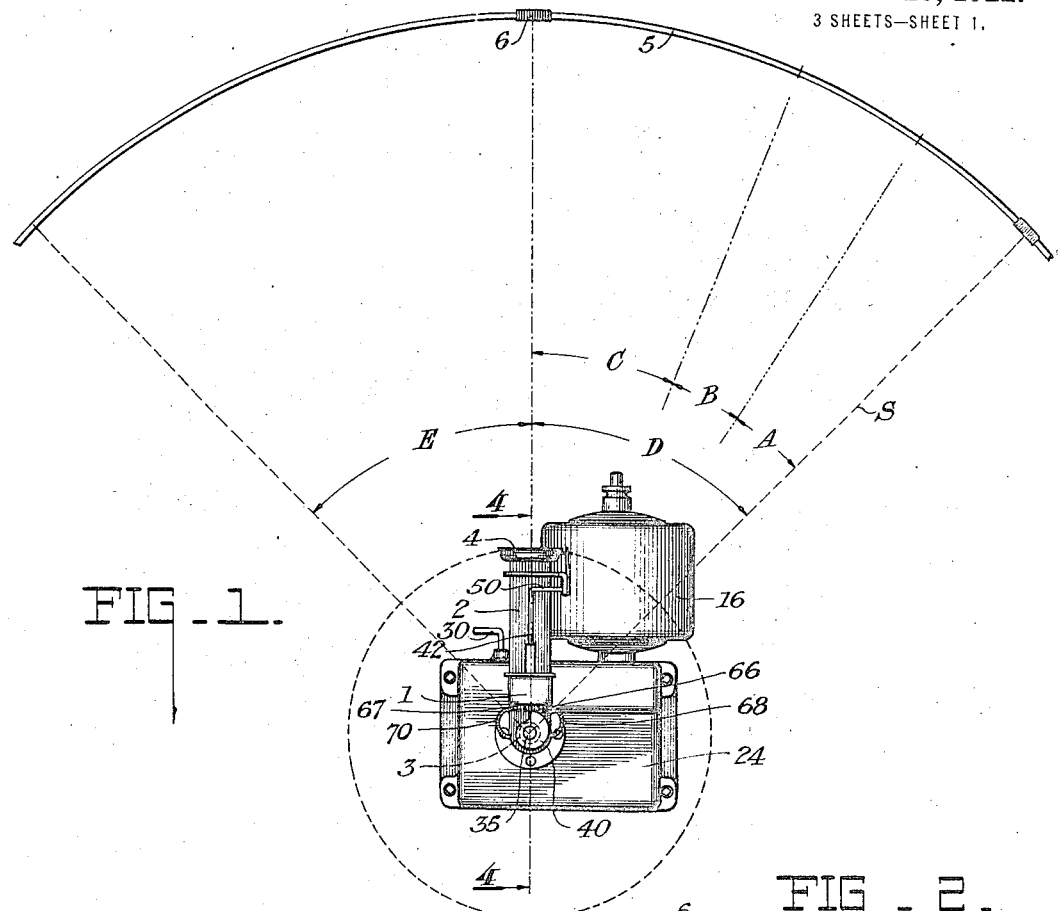
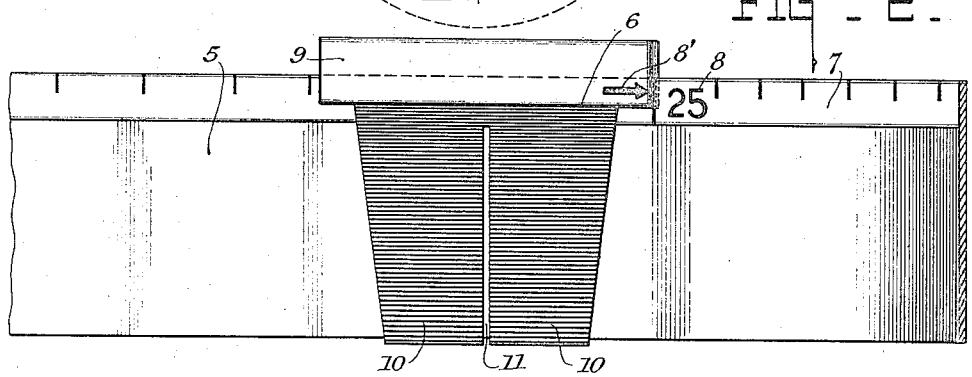
WITNESSES:
N. M. Perrins
INVENTOR
William A. Riddell,
BY R. L. Stinchfield,
Donald H. Stewart.
ATTORNEYS.

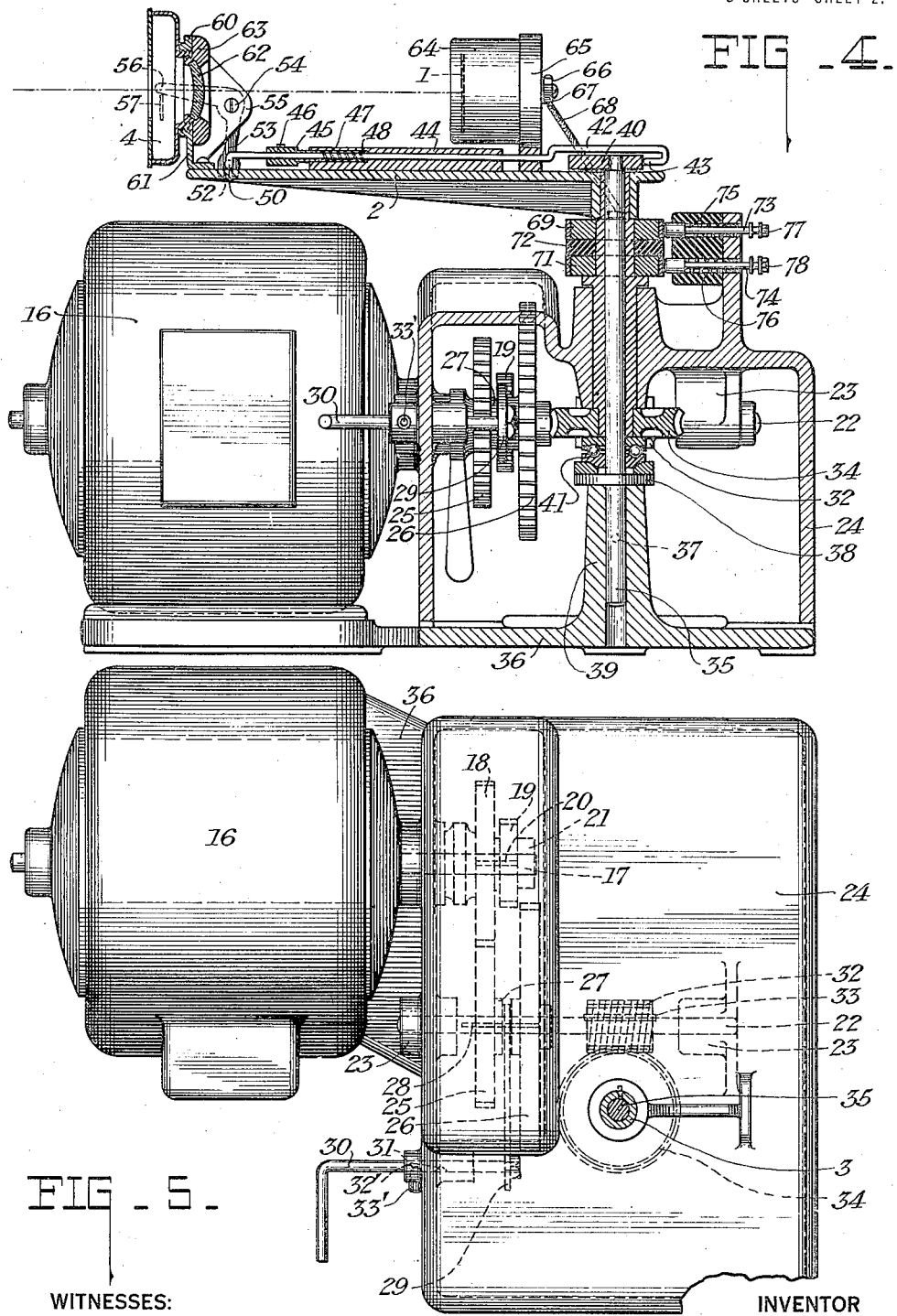

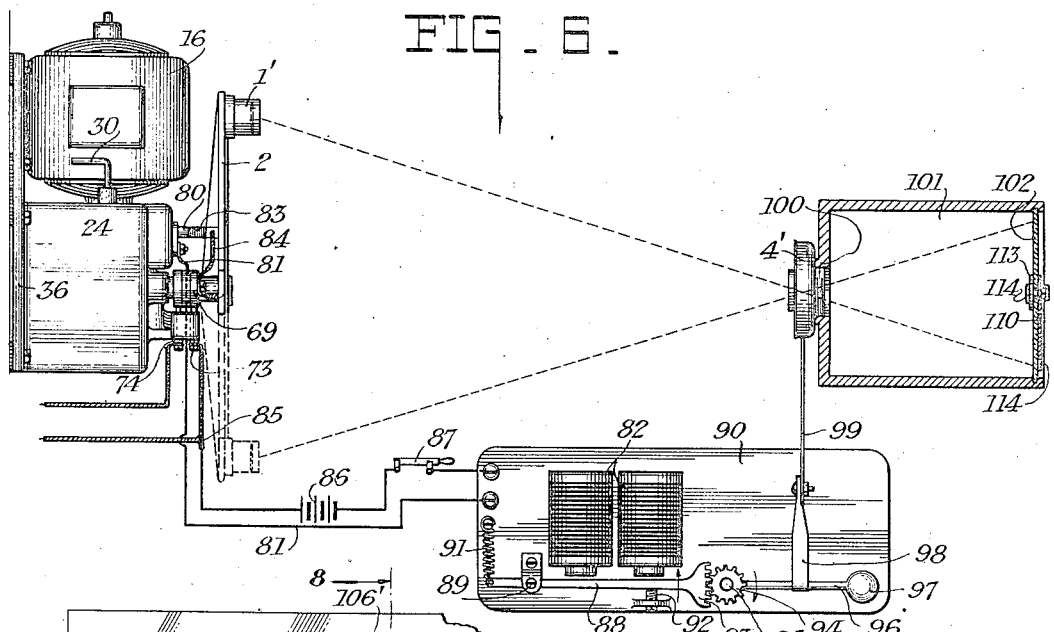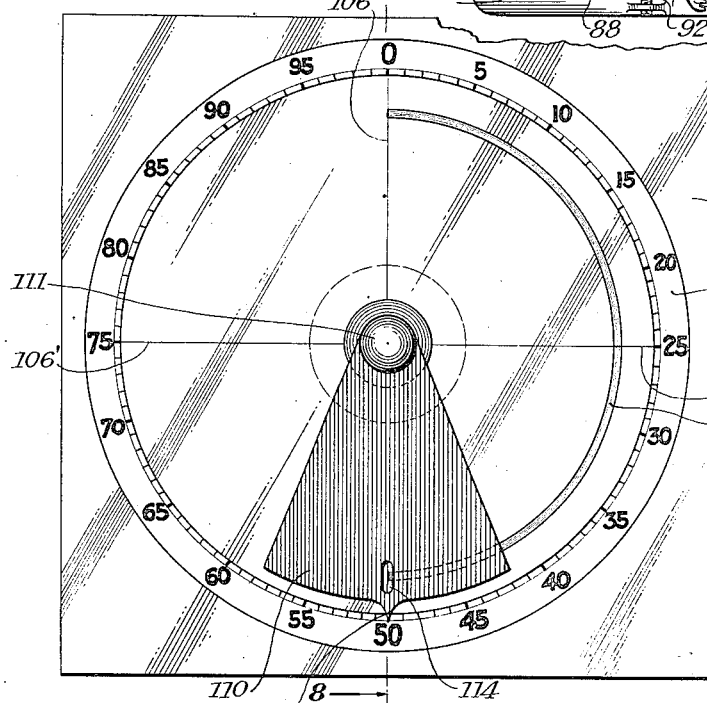

Patented Oct. 10, 1922.

1,431,897

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-SHUTTER SPEED-TESTING MACHINE.

Application filed September 13, 1920. Serial No. 409,928.

*To all whom it may concern:*

Be it known that I, WILLIAM A. RIDDELL, citizen of the United States of America, residing at Rochester, in the county of Monroe and State of New York, have invented certain new and useful Improvements in Photographic-Shutter Speed-Testing Machines, of which the following is a full, clear, and exact specification.

This invention relates to testing machines for photographic shutters and more particularly to machines for testing the speed of a shutter, being adapted to indicate the time elapsing between the opening and closing of the blades of photographic shutters.

There have been constructed hitherto numerous devices, of varying degrees of accuracy, for determining the speed of operation of a photographic shutter; but it has usually been necessary to make some kind of a record to be inspected later, on a sensitized surface, which must be submitted to photographic baths, before the result of the test is known. In factories where large numbers of shutters are assembled, it is, of course, highly desirable that they shall all come within a certain degree of accuracy.

The main object of my invention is to construct a shutter tester in which the individual shutters may be placed, and a direct reading made; that is, a reading by the eye at the time. Other objects are to make such a tester which will be accurate within the degree of tolerance necessary in factory tests; which is simple in structure and theory so as not to require a skilled physicist or laboratory worker, but which can be used by any intelligent workman; which can be used with shutters of different structures; and upon which a reading may be repeated any number of times in rapid succession, enabling the operator to check the reading. Further objects are to provide calibrations by which direct readings are possible and means to adjust the calibrations as required for any shutter to permit exact readings; to change the scale of reading to permit higher speeds to be read on a different scale from the lower speeds; and to operate the shutter automatically at such a period in the functioning of the device that the zero point for different readings will be the same.

To these and other ends the invention consists of certain improvements and combination of parts, all as will be hereinafter more fully described, the novel features being pointed out in the claims at the end of the specification.

In the drawings, in which like reference characters designate like parts throughout:

Fig. 1 is a plan view of a tester constructed in accordance with, and illustrating one embodiment of my invention;

Fig. 2 is an enlarged fragmentary section of one type of scale;

Fig. 3 is a section of another type of scale which may be used with the machine illustrated in Fig. 1;

Fig. 4 is an enlarged section on line 4—4 of Fig. 1;

Fig. 5 is a plan view of the same machine as shown in Fig. 4, the turntable being cut off, and the shaft being shown in section;

Fig. 6 is an elevation, partly in section, of another type of machine embodying the principles of my invention;

Fig. 7 is an enlarged view of the screen and indicator used with the machine illustrated in Fig. 6; and Fig. 8 is a section on line 8—8 of Fig. 7.

This machine determines the speed of a shutter by measuring the length of a light path upon a scale, the light being passed through the shutter being tested.

Referring now to the drawings, in the embodiment shown in Fig. 1, there is a lamp 1, mounted to revolve on a turntable 2, which is carried by a hollow shaft 3, by which it is moved. One end of the turntable carries a shutter 4 in position for testing. The light from lamp 1 passes through shutter 4 to a screen 5, which may be made of tracing linen, ground pyroxylin, ground glass or other suitable substance. An indicator 6 is used for locating the end of a light path made when a beam of light passes through the shutter to the screen as the turntable revolves and the shutter is actuated.

The screen 5 is preferably provided along its top edge with a scale 7 bearing graduations 8 divided into units of time. In Fig. 2 the units are fractions of a second, the numeral "25" indicating 1/25th of a second. The indicator or slide 6 consists of a grooved head 9 sliding on the screen, and from it a plate 10 slotted at 11 extends down across the screen. This plate is preferably opaque, although a semi-opaque material such as colored pyroxylin answers the purpose admirably. An arrow 8' points to the speed indicated by the setting. The operator moves this plate until the light vanishing point comes within slot 11, as will be more fully hereinafter described.

Another type of screen scale is illustrated in Fig. 3, where the screen 5 is provided with a sliding scale 12, U-shaped in cross section, bearing graduations 8 similar to those of scale 7. An indicator plate 13 with a slot 14 is affixed to the zero or starting position on scale 12, while a movable indicator plate 15 slotted at 15' slides upon the scale 12. These indicating plates are of the same material as indicator 6. This type enables the operator to adjust scale 12 to any starting position desired, which is necessary for some types of shutters.

As the light must be revolved with a uniform known speed, I find the following mechanism suitable. A motor 16 of the constant speed type turns a shaft 17 to which gears 18 and 19 are fastened with a key 20 and nut 21, (see Fig. 5). A stub shaft 22 is carried by bearings 23 cast in the sides of a housing 24 which conceals the gearing. Upon this shaft gears 25 and 26 joined by a sleeve 27, slide axially, but they turn with the shaft upon the key 28. A yoke 29 operated through a handle 30 shifts these gears into mesh, thereby obtaining two speeds. Sockets 31 and 32' in handle 30 provide seats into which a spring pin 33' can snap, thus holding the gears in the desired relation. A worm gear 32 keyed at 33 to shaft 22 transmits power to a worm gear 34 affixed to a hollow shaft 3 which surrounds a stationary shaft 35. Shaft 35 is pinned to casting 36 by a screw 37, there being a sleeve 38 on the shaft resting on the top of a bearing 39 extending up from the base 36. Turntable 2 being fastened to hollow shaft 3 revolves with it, while a cam 40 is mounted on shaft 35 and remains stationary. A ball bearing 41 carries shaft 3 so as to revolve freely.

In order to trip the shutter 4 as a predetermined starting point is reached, the following mechanism is employed. A plunger 42 has a bent end 43 resting on the cam 40, and extends forwardly through a bearing 44 toward the shutter. A sleeve 45 fastened to the plunger by a screw 46 compresses a spring 47 in the bore 48 of bearing 44 so that the end 43 is always pressed against the cam. The other end, 50, of plunger 42 is embraced by a slot 52 in one arm 53 of a bell crank lever pivoted at 54 to a support 55. The other arm 56 directly engages the shutter tripping lever 57. As the turntable revolves, the shutter will be tripped once at each revolution through the stationary cam, plunger 42 and the bell crank lever just described.

The shutter 4 screws into a socket 60 supported by an extension 61 of turntable 2. The best results can be obtained by providing a sharp line of light upon the screen 5, so that I use a lamp of the Nernst type preferably, because this provides a line of brilliant light which can be thrown upon the screen in sharp focus by a lens 62, here carried by a cell 63 and screwed into the shutter. If desired the lens can be mounted in front of the lamp, but the most satisfactory results are obtained with the apparatus as described.

The Nernst lamp 1 is so well known that no description is necessary except that here it is carried by a housing 64, upon a bracket 65, terminals 66 and 67 being carried on the housing. A wire 68 connects terminals 66 with the contact ring 69, while a similar wire 70 connects 67 with the contact ring 71 separated from ring 69 by insulation 72. These rings and insulation revolve as a unit with hollow shaft 3 and derive power for the lamp through spring plungers 73 and 74 pressed by springs 75 and 76 against the contact rings. Nuts 77 and 78 are for connecting the plungers to a suitable source of power.

The time of exposure is indicated by the angular travel of the lamp, and consequently, by the distance between the starting and vanishing points of the light path on the screen. In Fig. 1 for instance, if the angle A represents the light travel for 1/100th of a second, A+B will represent 1/50th, A+B+C 1/25th, etc., when the lamp is running at high speed. Shifting the clutch so as to slow up the lamp, D would represent 1/2 second, while D and E would equal one second. Thus it will be seen that with the light traveling at a known speed, scales can be readily calculated for any position of the screen.

The operation of the machine as thus far described is as follows: A shutter is mounted in place and the motor is started. To test a high speed, the lever 30 is adjusted as shown in Fig. 5 to run at its highest speed. Each time the shutter passes a predetermined point, as for instance, the line indicated by S, Fig. 1, the shutter is tripped and the leaves opened, a light path, therefore, starts on the screen as the light rays reach the screen through the shutter. When the shutter leaves close the light stops. The operator, who has previously placed the indicator at approximately the proper point, moves it until the vanishing point of the light is in slot 11. If desirable the exposure may be repeated automatically to determine the proper location of the indicator, and also to determine if the shutter will constantly repeat the same exposure. The time is then read from the scale, as for instance, 1/25th of a second from the scale in Fig. 2.

There are, however, some shutters which will not give accurate results when using the above methods because of play between the shutter operating lever and the shutter leaf operating mechanism. For these shutters the scale shown in Fig. 3 is used, first setting the starting point of the light path by setting indicator 14, (thus moving the entire scale) and then setting indicator 15 so that the light vanishing point will come in slot 15'.

In Figs. 6, 7, and 8 I illustrate another method of testing a shutter, using a motor operated turntable of the same construction as that shown in the previous figures. These parts will not be again described. The lamp 1', is preferably mounted toward the end of turntable 2, at right angles to its previous position, and may be adjusted along the turntable. In addition to the electrical connection for the lamp, as previously described, I provide a contact 80 on the housing 24, from which a wire 81 leads to a magnet 82. A contact 83 is fastened to the under side of turntable 2 and is provided with a feed wire 84 which connects up with contact ring 79 so that the circuit passes through spring plunger 73 to the moving ring. Wire 84 then branches from the light wire at 85, going then to a battery 86, through a switch 87 to the magnet 82.

This magnet operates the shutter 4' through an armature 88, pivoted at 89 to the base 90. A spring 91 holds the armature against a limiting post 92. The end of the armature ends in a gear segment 93 meshing with a gear 94 pivoted to the base 90 by a shoulder pin 95. Gear 94 carries integral therewith an arm 96 terminating in a balance weight 97. Links 98 and 99 connect this arm with the shutter tripping lever. At each revolution of the turntable the shutter circuit is completed, and, if the switch 87 is closed the shutter will operate. This arrangement starts the shutter when the lamp is in any predetermined position, here shown as in its uppermost position.

Instead of the curved screen used with the first apparatus described, I use here a camera, illustrated diagrammatically as consisting of a lens holder 100 carried on the front of a body on box 101 and having a specially prepared ground glass 102 at the back of the box. When testing shutters on a large scale I find it more convenient to use cameras of the box type as illustrated, providing separate boxes for the different standard sized shutters. But one camera with a long bellows draw will be sufficient for all types of shutters. The shutter 4' is carried on the front of the box and is in position to focus the light (there being a lens in the shutter) on the ground glass. To get a comparatively large image the camera is placed close to the light, and the distance between the shutter and the ground glass is then necessarily made much greater than the focal length of the lens, so as to focus the light upon the screen.

The ground glass 102 carries a circular scale 105, which can conveniently be made of paper cemented in place, and may or may not have centering hair lines 106' etched on the glass, although these make it easier to properly locate the scale. Here the scale 105 is graduated into units of 100 parts of a second, the light path 106 showing an exposure of 50/100ths or 1/2 of a second. While I have illustrated the light path as being continuous from the zero to the 50/100ths mark, this is to illustrate the complete exposure, but in reality the light is only at one point at a time, so that it only shows on the ground glass in a position relative to that of the lamp, as it revolves.

An indicator 110 is fitted to a knurled nut 111 having a shank 112 passing through the ground glass 102 and into washer 113 and nut 114, which are arranged to furnish just enough friction to hold the indicator in the position to which it is turned. A window 114 for locating the light vanishing point, which can readily be done after one or two trial exposures, is cut through the indicator above the pointer 115.

The operation of this device is like the first one described, in that the motor is started and the shutter is actuated at each revolution of the lamp, the only difference being that the light path is measured upon a much smaller screen.

As will be seen from the description of these embodiments of my invention, I provide a machine which is adapted for use on the bench for testing the speeds of newly assembled shutters, and one which can be used without the delay of performing photographic operations of developing and printing a negative. It is obvious that many changes can be made without departing from the spirit of my invention.

I consider as within the scope of my invention as defined in the appended claims, all apparatus for the direct visual comparison with a scale or standard of a moving beam of light, the movement of which is rendered comparable with the scale by the operation of the shutter to be tested.

Having thus described my invention, what I claim as new and desire to secure by Letters Patent:

1. In a device of the class described, a screen having associated therewith a graduated scale, means for projecting thereon a movable beam of light and means for holding a photographic shutter in the path of said beam of light in position to be actuated, to control by its actuation the projection of the beam of light upon the screen, the path of movement of the beam on the screen being directly visually comparable with the scale.

2. In a device of the class described, a screen having associated therewith a graduated scale, means for projecting thereon a movable beam of light, means for holding a photographic shutter in position to control by its actuation the projection of the beam of light upon the screen, the path of movement of the beam on the screen being directly visually comparable with the scale, and means for causing the beginning of the path of the projected beam to correspond with a predetermined graduation of the scale.

3. In a device of the class described, a screen having associated therewith a graduated scale, a source of light movable with respect to the scale and means for holding a photographic shutter in position to intercept rays from the source to the screen, whereby when the shutter is actuated to open and close, there will be thrown upon the screen a moving beam of light, the length of whose path will be proportional to the speed of relative movement of the screen and source and to the duration of the opening of the shutter, and which path is directly visually comparable to the scale.

4. In a shutter testing machine, the combination with a screen, of a source of light, means for moving one with respect to the other, means for holding a shutter between the source and screen, and means for automatically actuating the shutter when the screen and source are in a predetermined location with respect to each other.

5. In a shutter testing machine, the combination with a screen, of a source of light, means for moving one relative to the other to cause a beam of light to move on the screen, a scale for determining the length on the screen of the light beam, means for holding a shutter in the path of the light beam, and automatic means for tripping the shutter when the light beam reaches a predetermined position relative to the scale.

6. In a shutter testing machine, the combination with a screen, of a revoluble lamp, means for holding a shutter to be tested, and means for tripping the shutter at each revolution of the lamp.

7. In a shutter testing machine, the combination with a screen, of a revoluble lamp, means for holding a shutter to be tested, and means for tripping the shutter at each revolution of the lamp and at a predetermined point in its revolution.

8. In a photographic shutter tester, the combination with a screen, of a lamp, means for moving one relative to the other, means for holding a shutter in position to intercept light rays passing from the lamp to the screen, a movable slide on the screen, means on the slide for locating one end of the path of the beam of light passed by the shutter.

9. In a photographic shutter tester, the combination with a screen, of a lamp, means for moving one relative to the other, means for holding a shutter in position to intercept light rays passing from the lamp to the screen, a scale, and a movable slide co-operating with the scale, the movable slide being adapted to locate one end of the path of the beam of light passed by the shutter.

10. In a photographic shutter tester, the combination with a screen, of a lamp, means for moving one relative to the other, means for holding the shutter in position to intercept light rays passing from the lamp to the screen, and independent movable means for locating on the screen each end of the path of the beam of light passed by the shutter.

11. In a photographic shutter tester, the combination with a screen, of a lamp, means for moving one relative to the other, means for holding a shutter in position to intercept light rays passing from the lamp to the screen, a movable scale, and means on the movable scale for locating one end of the path of the beam passed by the shutter.

12. In a photographic shutter tester, the combination with a screen, of a lamp, means for moving one relative to the other, means for holding a shutter in position to intercept light rays passing from the lamp to the screen, a movable scale, and means on the movable scale for locating one end of the path of the beam passed by the shutter, and independently movable means for locating the other end of the path.

13. In a photographic shutter tester, the combination with a screen, of a lamp, means for moving one relative to the other, means for holding a shutter in position to intercept light rays passing from the lamp to the screen, a movable scale, means for locating one end of the light path passed by the shutter, and a movable slide adapted to locate the other end of the light path passed by the shutter.

14. In a shutter testing machine, the combination with a screen, a lamp, and a movable carrier for said lamp, means for holding a photographic shutter in a position to control a beam of light from the lamp to the screen, a motor for operating the lamp carrier, and a clutch between the motor and the lamp carrier, whereby the speed of movement of the lamp may be varied to change the speed of movement of the beam of light so controlled.

15. In a shutter testing machine, the combination with a screen, a lamp, and a shutter holder, of a revoluble turntable for carrying the lamp, a motor for operating the turntable, means for varying the speed of the turntable to alter the speed of movement of a beam of light passed by the shutter from the lamp to the screen.

Signed at Rochester, New York, this 8th day of September, 1920.

WILLIAM A. RIDDELL.